(12) United States Patent
Meguriya et al.

(10) Patent No.: US 9,045,637 B2
(45) Date of Patent: Jun. 2, 2015

(54) ADDITION CURING SILICONE RUBBER COMPOSITION AND ITS CURED PRODUCT

(75) Inventors: Noriyuki Meguriya, Annaka (JP); Shinichi Ide, Annaka (JP); Toshio Yamazaki, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 370 days.

(21) Appl. No.: 12/061,467

(22) Filed: Apr. 2, 2008

(65) Prior Publication Data

US 2008/0249244 A1 Oct. 9, 2008

(30) Foreign Application Priority Data

Apr. 5, 2007 (JP) ................. 2007-099068

(51) Int. Cl.
*C08L 83/04* (2006.01)
*C08G 77/04* (2006.01)
*C08G 77/12* (2006.01)
*C08G 77/20* (2006.01)

(52) U.S. Cl.
CPC ............... *C08L 83/04* (2013.01); *C08G 77/045* (2013.01); *C08G 77/12* (2013.01); *C08G 77/20* (2013.01)

(58) Field of Classification Search
None
See application file for complete search history.

(56) References Cited

U.S. PATENT DOCUMENTS

| | | | | | |
|---|---|---|---|---|---|
| 4,937,055 | A | * | 6/1990 | Kittler et al. | 427/126.3 |
| 4,985,526 | A | * | 1/1991 | Kishita et al. | 528/15 |
| 5,025,073 | A | * | 6/1991 | Lewis et al. | 528/15 |
| 5,145,931 | A | | 9/1992 | Nakayoshi et al. | |
| 5,770,216 | A | * | 6/1998 | Mitchnick et al. | 428/402 |
| 6,004,496 | A | * | 12/1999 | Reo | 264/130 |
| 6,908,865 | B2 | | 6/2005 | Kranz et al. | 438/710 |
| 7,390,349 | B2 | * | 6/2008 | Lautamo | 95/88 |
| 7,687,591 | B2 | * | 3/2010 | Bhagwagar et al. | 528/25 |
| 2004/0106706 | A1 | | 6/2004 | Tanaka et al. | |
| 2004/0250926 | A1 | * | 12/2004 | Branagan | 148/527 |
| 2007/0212819 | A1 | | 9/2007 | Tamura et al. | |
| 2010/0188746 | A1 | * | 7/2010 | Coleman et al. | 359/459 |

FOREIGN PATENT DOCUMENTS

| | | |
|---|---|---|
| DE | 35 32 686 A1 | 3/1987 |
| EP | 1 311 011 A2 | 5/2003 |
| JP | 63-44681 A | 2/1988 |
| JP | 3-157474 A | 7/1991 |
| JP | 4-311764 A | 11/1992 |
| JP | 6-37213 A | 2/1994 |
| JP | 6-54405 A | 2/1994 |
| JP | 6-83225 A | 3/1994 |
| JP | 2004-182758 A | 7/2004 |
| WO | WO-2005/057647 A1 | 6/2005 |

OTHER PUBLICATIONS

Japanese Office Action dated Aug. 10, 2011, for Application No. 2007-099068.

* cited by examiner

*Primary Examiner* — Marc Zimmer
(74) *Attorney, Agent, or Firm* — Birch, Stewart, Kolasch & Birch, LLP

(57) ABSTRACT

An addition curing silicone rubber composition and a cured product thereof are provided. In this composition, amount of the low molecular weight siloxane component volatilizing from the cured product has been reduced, and as a consequence, this composition is free from the problems such as clouding or haze, contact fault, adhesion failure, and hydrophobicization of the surface caused by the deposition of the volatilized low-molecular weight siloxane component on the surrounding surfaces. More specifically, the addition curing silicone rubber composition comprises; (A) 100 parts by weight of a polyorganosiloxane containing, on average, at least two alkenyl groups which are bonded to silicon atom; (B) 0.3 to 20 parts by weight of an organohydrogenpolysiloxane containing at least two hydrogen atoms which are bonded to silicon atom (SiH functional groups) per molecule; and (C) a catalytic amount of a addition reaction catalyst, and content of the polyorganosiloxane having a degree of polymerization of up to 10 and containing at least one SiH functional group per molecule is up to 0.5% by weight in relation to the entire composition.

13 Claims, No Drawings

ADDITION CURING SILICONE RUBBER COMPOSITION AND ITS CURED PRODUCT

CROSS-REFERENCE TO RELATED APPLICATION

This non-provisional application claims priority under 35 U.S.C. §119(a) on Patent Application No. 2007-099068 filed in Japan on Apr. 5, 2007, the entire contents of which are hereby incorporated by reference.

TECHNICAL FIELD

This invention relates to an addition curing silicone rubber composition having a reduced content of reactive volatile siloxane compounds, and in particular, a reduced content of the volatile siloxane compounds containing hydrogen atoms which are bonded to the silicon atom (hereinafter abbreviated as SiH functional groups), and a cured product produced from such composition.

BACKGROUND ART

Silicone rubbers are used in a wide variety of fields to take advantage of their heat resistance, cold resistance, and electric characteristics. However, since the siloxane polymers used in the production of the silicone rubber is generated by equilibrium reaction of the siloxane oligomer by acid or alkali, it is known that a considerable amount of the so called "non-functional" cyclic siloxane having no reactive group such as SiH functional group or alkenyl functional group in the molecule, namely, the so called "low-molecular weight siloxane" which has a degree of polymerization (namely, number of silicon atoms per molecule) of up to 20 would remain in the reaction product irrespective of the degree of polymerization. While such low-molecular weight siloxane can be removed by volatilizing at reduced pressure or at high temperature, complete removal has been difficult, and the resulting product always contained such low-molecular weight siloxane at a concentration of approximately 1% by weight, or at a lower concentration of about 0.5% by weight (about 5,000 ppm). Such low-molecular weight siloxane volatilizes not only in high temperature atmosphere, but it has been known that a slight amount of such siloxane also volatilizes from the cured rubber at room temperature and deposits on the surrounding surfaces causing various problems such as clouding or haze, contact fault, adhesion failure, and hydrophobicization of the surface. While such problems can be obviated to certain extent by post-curing the cured rubber at a high temperature, there are still problems such as incapability of exposing to such high temperature when the rubber is used in sealed condition or when the rubber is used in a module in combination with other less heat resistant resin.

For example, JP-A 3-157474 (Patent Document 1) corresponding to U.S. Pat. No. 5,145,931 discloses an addition curing silicone rubber adhesive wherein content of the low-molecular weight siloxane having a vapor pressure at 200° C. of at least 10 mmHg is up to 500 ppm. JP-B 6-54405 (Patent Document 2) discloses a fixing roller wherein content of the low-molecular weight siloxane having the degree of polymerization of up to 20 is up to 0.75% by weight. JP-A 4-311764 (Patent Document 3) discloses a method for producing a siloxane polymer having a reduced content of the low-molecular weight siloxane by extending the chain length using a polymer having SiH functional group at opposite ends thereof.

However, even if content of such low-molecular weight siloxane were reduced, the product still suffered from the problems as described above as well as the problem that removal of the low-molecular weight siloxane that had deposited on the surrounding surface by volatilization from the cured product had been difficult even by means of wiping with a solvent.

DISCLOSURE OF THE INVENTION

The present invention has been completed in view of such situation, and an object of the present invention is to provide an addition curing silicone rubber composition wherein amount of the low molecular weight siloxane component that volatilizes from the cured product has been reduced, and which is therefore free from the problems such as clouding or haze, contact fault, adhesion failure, and hydrophobicization of the surface caused by the deposition of the volatilized low-molecular weight siloxane component on the surrounding surfaces. Another object of the present invention is to provide a cured product produced from such composition.

In view of the situation as described above, the inventors of the present invention made an intensive study and found that, with regard to the low-molecular weight siloxane components, a considerable amount of a low-molecular weight cyclic siloxane component having a reactive group such as SiH functional group in its molecule is present in the siloxane polymer constituting the silicone rubber in addition to such low-molecular weight siloxane component having no functional group.

When the low-molecular weight siloxane having no functional group volatilizes from the cured rubber and deposits on the surrounding surface, it can be readily removed, for example, by wiping with a solvent. In contrast, removal of the low-molecular weight cyclic siloxane component having a reactive group is not easy because of its reactivity which results in the strong adhesion of the component to the substrate. As described above, the siloxane having SiH functional group is far more problematic than the low-molecular weight siloxane having no functional group such as dimethyl siloxane.

However, the Japanese Patent Application Kokai (Laid-Open) No. 3-157474 (Patent Document 1) only discloses cyclic or straight chain siloxane low-molecular weight siloxane which has no functional group (dimethylpolysiloxane) and is utterly silent about the low-molecular weight siloxane containing the SiH functional group. In the case of the Japanese Patent Publication No. 6-54405 (Patent Document 2), reference to the low-molecular weight siloxane is merely "3-mer to 20-mer cyclic polysiloxane" without any exemplification of the structure. It is also utterly silent about the SiH functional group. Japanese Patent Application Kokai (Laid-Open) No. 4-311764 (Patent Document 3) is also silent about the specific structure of the low-molecular weight siloxane. While there are quite a number of patent applications directed to the low-molecular weight siloxane, none disclose the low-molecular weight siloxane containing the SiH functional group.

The inventors of the present invention made further investigations and found that, since the polymer component having the SiH functional group is critical in the addition curing silicone rubber composition as a crosslinking agent for curing the silicone rubber composition, it is important to reduce the content of the volatile low-molecular weight cyclic siloxane component having the SiH functional group derived from the crosslinking agent to below a certain level to thereby solve the problems as described above.

More specifically, the inventors of the present invention found that, in the case of the addition curing silicone rubber composition, various problems caused on the surrounding surface by the volatilization of the low molecular weight siloxane such as contact fault, adhesion failure, and clouded appearance as well as the problem of difficulty of removing the low-molecular weight siloxane having the SiH functional group which has reacted with the surrounding substances can be solved by reducing the content of the low-molecular weight siloxane, and in particular, the low-molecular weight cyclic siloxane having a reactive group such as SiH functional group and having a degree of polymerization of up to 10 to the range of up to 0.5% by weight of the entire composition. The present invention has been completed on the bases of such finding.

Accordingly, the present invention provides the addition curing silicone rubber composition and its cured product as described below.

[1] An addition curing silicone rubber composition comprising (A) 100 parts by weight of a polyorganosiloxane containing, on average, at least two alkenyl groups which are bonded to silicon atom;

(B) 0.3 to 20 parts by weight of an organohydrogenpolysiloxane containing at least two hydrogen atoms which are bonded to silicon atom (SiH functional groups) per molecule; and (C) a catalytic amount of a addition reaction catalyst, wherein content of the polyorganosiloxane having a degree of polymerization of up to 10 and containing at least one SiH functional group per molecule is up to 0.5% by weight in relation to the entire composition.

[2] The addition curing silicone rubber composition according to [1] wherein ratio of the SiH functional group in the component (B) to the alkenyl group bonded to the silicon atom in the component (A) (SiH/Alkenyl group) is in the range of 0.6 to 3.0.

[3] The addition curing silicone rubber composition according to [1] wherein the polyorganosiloxane having a degree of polymerization of up to 10 and containing at least one SiH functional group per molecule is an organohydrogen siloxane-diorganosiloxane cyclic copolymer.

[4] The addition curing silicone rubber composition according to [3] wherein the polyorganosiloxane having a degree of polymerization of up to 10 and containing at least one SiH functional group per molecule is a cyclic organohydrogenpolysiloxane represented by the following formula (5):

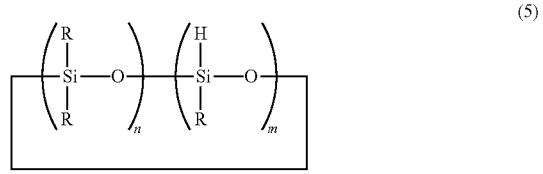

wherein m is an integer of 1 to 9 and n is an integer of 1 to 9 with the proviso that n+m is an integer of 3 to 10; R is independently an optionally substituted monovalent hydrocarbon group containing 1 to 10 carbon atoms.

[5] The addition curing silicone rubber composition according to [4] wherein, in the formula (5), m is an integer of 1 to 3 and n is an integer of 1 to 9 with the proviso that n+m is an integer of 3 to 10.

[6] The addition curing silicone rubber composition according to any one of [1] to [5] wherein content of the polyorganosiloxane having a degree of polymerization of up to 10 and containing no SiH functional group is up to 0.5% by weight in the component (A).

[7] The addition curing silicone rubber composition according to [7] wherein the polyorganosiloxane having a degree of polymerization of up to 10 and containing no SiH functional group is a cyclic polyorganosiloxane represented by the following formula (2):

wherein x is an integer of 3 to 10, and R is independently an optionally substituted monovalent hydrocarbon group containing 1 to 10 carbon atoms.

[8] The addition curing silicone rubber composition according to any one of [1] to [7] wherein the component (B) is an organohydrogenpolysiloxane having a straight chain, cyclic, branched, or three dimensional network structure with a degree of polymerization of at least 11.

[9] The addition curing silicone rubber composition according to [8] wherein the component (B) is an organohydrogenpolysiloxane represented by the following formula (4):

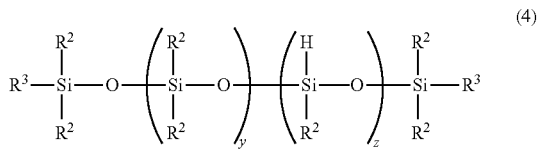

wherein y is an integer of 1 to 98 and z is an integer of 2 to 50 with the proviso y+z is 9 to 100, $R^2$ is independently an optionally substituted monovalent hydrocarbon group containing 1 to 10 carbon atoms, and $R^3$ is $R^2$ or hydrogen atom.

[10] The addition curing silicone rubber composition according to any one of [1] to [9] wherein ratio of the total number of hydrogen atoms which are bonded to the silicon atom to the total number of carbon atoms in the component (B) ([hydrogen atom]/[carbon atom]) is less than 0.6.

[11] The addition curing silicone rubber composition according to any one of [1] to [10] wherein content of the polyorganosiloxane having a degree of polymerization of up to 10 and containing at least one SiH functional group per molecule in the component (B) is up to 10.0% by weight.

[12] A cured silicone rubber produced by curing the addition curing silicone rubber composition of any one of [1] to [11].

[13] The addition curing silicone rubber composition according to [12] wherein content of the polyorganosiloxane having a degree of polymerization of up to 10 and containing at least one SiH functional group per molecule is up to 0.5% by weight.

EFFECTS OF THE INVENTION

The addition curing silicone rubber composition of the present invention can be cured into a cured product which exhibits reduced volatilization of the low-molecular weight siloxane component having the degree of polymerization of up to 10 and containing at least one SiH functional group per molecule that results in the deposition of such component on the surrounding surface and adhesion to such surface by reacting with the surface, and which is free from the problems such as clouding or haze, contact fault, adhesion failure, and hydrophobicization of the surface caused by the deposition of the volatilized low-molecular weight siloxane component on the surrounding surfaces.

DESCRIPTION OF THE PREFERRED EMBODIMENTS

The polyorganosiloxane containing, on average, at least two alkenyl groups per molecule which is the component (A) of the present invention is the main ingredient (base polymer) of the composition, and this alkenyl-containing polyorganosiloxane is preferably the one represented by the following average compositional formula (1):

$$R^1_a SiO_{(4-a)/2} \quad (1)$$

wherein $R^1$ is independently an optionally substituted monovalent hydrocarbon group containing 1 to 10, and preferably 1 to 8 carbon atoms, a is a positive number of 1.5 to 2.8, preferably 11.8 to 2.5, and more preferably 1.95 to 2.05. The "average number of the alkenyl groups per molecule" is the average number of the number of alkenyl groups in one molecule as determined by GPC (gel permeation chromatography) expressed in terms of polystyrene.

Examples of the optionally substituted monovalent hydrocarbon group bonded to the silicon atom which is represented by $R^1$ include alkyl groups such as methyl group, ethyl group, propyl group, isopropyl group, butyl group, isobutyl group, tert-butyl group, pentyl group, neopentyl group, hexyl group, cyclohexyl group, octyl group, nonyl group, and decyl group; aryl groups such as phenyl group, tolyl group, xylyl group, and naphthyl group; aralkyl groups such as benzyl group, phenylethyl group, and phenylpropyl group; alkenyl groups such as vinyl group, allyl group, propenyl group, isopropenyl group, butenyl group, hexenyl group, cyclohexenyl group, and octenyl group; and any one of such groups having its hydrogen atoms partly or entirely substituted with a halogen atom such as fluorine, bromine, or chlorine or cyano group such as chloromethyl group, chloropropyl group, bromoethyl group, trifluoro propyl group, and cyanoethyl group. Preferably, 90% or more of the $R^1$ is methyl group.

In addition, at least two of the $R^1$ should be an alkenyl group (which preferably contains 2 to 8 carbon atoms, and more preferably 2 to 6, and which is most preferably vinyl group). Content of the alkenyl group is preferably $5.0 \times 10^{-6}$ to $5.0 \times 10^{-3}$ mol/g, and most preferably $1.0 \times 10^{-5}$ to $1.0 \times 10^{-3}$ mol/g in the polyorganosiloxane. When the content of the alkenyl group is less than $5.0 \times 10^{-6}$ mol/g, hardness of the rubber will be insufficient and sufficient sealability will not be realized, whereas the content in excess of $5.0 \times 10^{-3}$ mol/g may result in an unduly high crosslinking density and brittle rubber. This alkenyl group may be bonded to the silicon at the end of the molecular chain and/or to the silicon atom in the midst of the molecular chain.

The polyorganosiloxane typically has a straight chain structure wherein the backbone primarily comprises repetition of a diorganosiloxane unit with its opposite ends terminated with a triorganosiloxy group. The polyorganosiloxane, however, may also have a partly branched structure or a cyclic structure. The molecular weight is not particularly limited, and the polyorganosiloxane may range from a liquid polyorganosiloxane having a low viscosity (typically having a viscosity at 25° C. as measured by a rotary viscometer of about 100 to 1,000,000 mPa·s, preferably about 300 to 500,000 mPa·s, and more preferably about 1,000 to 100,000 mPa·s) to a raw rubber-like polyorganosiloxane having a high viscosity (which is hardly flowable at room temperature (25° C.)) (with the viscosity at 25° C. of, for example, higher than 1,000,000 mPa·s, and in particular, 2,000,000 to 10,000,000 mPa·s (with an average degree of polymerization of 3,000 to 10,000), or with an even higher viscosity (namely, even higher degree of polymerization)).

Furthermore, the alkenyl-containing polyorganosiloxane (base polymer) of the component (A) is preferably the one wherein content of the low-molecular weight siloxane component having no functional group (namely, the low-molecular weight siloxane content having no functional group which is involved in the hydrosilylation addition reaction between the component (A) and the component (B)) as described in the section of the Prior Art is reduced to the level below the predetermined content. More specifically, content of the low-molecular weight siloxane having no functional group having a degree of polymerization of up to 10 is up to 0.5% by weight (0 to 0.5% by weight), preferably up to 0.2% by weight (0 to 0.2% by weight), and more preferably up to 0.1% by weight (0 to 0.1% by weight) in the component (A). When the content of the low-molecular weight siloxane component having no functional group is in excess of 0.5% by weight, the problem is not only that its volatilization adversely affects the surrounding parts, but also, such content facilitates volatilization of the reactive low-molecular weight siloxane having the SiH functional group.

Examples of such low-molecular weight siloxane having no functional group include a diorganocyclopolysiloxane having a cyclic structure as represented by the following formula (2):

wherein x is an integer of 3 to 10; and R is independently an optionally substituted monovalent hydrocarbon group containing 1 to 10 carbons. Examples of the R include those described above for $R^1$.

The content of the low-molecular weight siloxane component having no functional group may be reduced, for example, by vaporizing such low-molecular weight siloxane component at a high temperature of about 200 to 300° C. under reduced pressure to facilitate its removal, or by introducing an inert gas to thereby facilitate the vaporization during or after such removal by vaporization.

Typically, the reactive low-molecular weight siloxane having a degree of polymerization of up to 10 and having at least one SiH functional group per molecule as described below is not present in the alkenyl-containing polyorganosiloxane of the component (A) at a level that would cause substantial problems.

The component (B) is an organohydrogenpolysiloxane containing at least two (typically 2 to 300), preferably at least 3 (for example, 3 to 200), and more preferably about 4 to 150 hydrogen atoms which is bonded to silicon atom (SiH functional group) per molecule, and the SiH functional group in the molecule serves the curing agent (crosslinking agent) for curing of the composition by crosslinking through addition reaction (hydrosilylation) with the alkenyl group bonded to the silicon atom of the component (A) resulting in the curing.

The organohydrogenpolysiloxane of the component (B) may be at least one organohydrogenpolysiloxane represented, for example, by the following average compositional formula (3):

wherein $R^2$ is an optionally substituted monovalent hydrocarbon group containing 1 to 10 carbon atoms; and b is a positive number of 0.7 to 2.1, c is a positive number of 0.001 to 1.0, with the proviso that b+c is 0.8 to 3.0; and having at least 2 (typically, 2 to 300), preferably at least 3 (for example, 3 to 200), and more preferably about 4 to 150 hydrogen atoms bonded to the silicon atom per molecule.

Examples of the monovalent hydrocarbon group of $R^2$ include those mentioned for $R^1$. The monovalent hydrocarbon group of $R^2$, however, is preferably the one not containing an aliphatic unsaturated group. Preferably, b is 0.8 to 2.0, c is 0.01 to 1.0, and b+c is 1.0 to 2.5.

Preferably, the organohydrogenpolysiloxane used is the one which is liquid at room temperature (25° C.) with the number of silicon atoms per molecule (or the degree of polymerization) of about 2 to 300, preferably about 3 to 250, more preferably about 4 to 200, still more preferably about 5 to 150, and, and most preferably about 11 to 100 (typically corresponding to a viscosity as measured by rotary viscosity of about 0.1 to 1,000 mPa·s, and preferably about 0.5 to 500 mPa·s).

The hydrogen atom bonded to the silicon atom may be either the one bonded to the silicon atom at the end of the molecular chain or the one bonded to the silicon atom in the side chain or both.

The organohydrogenpolysiloxane may have a molecular structure which is any one of straight chain, cyclic, branched, or three dimensional network structures. Preferably, the organohydrogenpolysiloxane is at least one member selected from organohydrogenpolysiloxanes having a straight chain, branched, or three dimensional network structure and an organohydrogencyclopolysiloxane (a cyclic polymer solely comprising organohydrogensiloxane unit). Also, the organohydrogenpolysiloxane is preferably at least one member selected from organohydrogenpolysiloxanes having the degree of polymerization (the number of silicon atoms per molecule) of at least 11, and organohydrogenpolysiloxanes having at least four SiH functional groups per molecule, and most preferably, at least one member selected from organohydrogenpolysiloxanes of straight chain, cyclic, branched, or three dimensional network structure having the degree of polymerization (the number of silicon atoms per molecule) of at least 11 and having at least four SiH functional groups per molecule.

Typical example of the straight chain organohydrogenpolysiloxane is the one represented by formula (4):

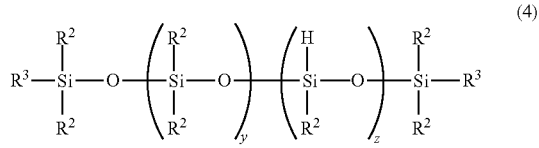

wherein y is an integer of 1 to 98, and z is an integer of 2 to 50, with the proviso that y+z is an integer of 9 to 100; $R^2$ is as defined above; and $R^3$ is $R^2$ or hydrogen atom. Preferably, 90% of the $R^2$ is methyl group.

When the organohydrogenpolysiloxane is a cyclic organohydrogenpolysiloxane and it is an organohydrogencyclopolysiloxane solely comprising the repeating unit of an organohydrogensiloxane unit (for example, a bifunctional siloxane unit represented by $R^2HSiO_{2/2}$), or a diorganosiloxane-organohydrogen siloxane cyclic copolymer containing a diorganosiloxane unit (for example, $R^2{}_2SiO_{2/2}$) as a part of its repeating units in addition to the organohydrogensiloxane unit, it is preferably a cyclic polymer having the degree of polymerization (namely, the number of silicon atoms in the molecule) of at least 11, or a SiH functional group-rich cyclic polymer having the number of the SiH functional groups in the molecule (namely, the repetition number of the organohydrogensiloxane units in the molecule) of at least four.

The ratio of the total number of hydrogen atoms bonded to the silicon atom to the total number of carbon atoms in the molecule (for example, total number of carbon atoms in $R^2$ is preferably such that: [hydrogen atom]/[carbon atom]<0.6, more preferably, 0.05<[hydrogen atom]/[carbon atom]≤0.5, still more preferably, 0.1≤[hydrogen atom]/[carbon atom]≤0.4, and most preferably, 0.25≤[hydrogen atom]/[carbon atom]≤0.4. When this ratio is 0.6 or higher, density of the SiH functional group will be too high and this may result in the foaming of the product, whereas the ratio of up to 0.05 may result in an unduly low reaction rate, and as a consequence, in the molding failure.

Examples of the organohydrogenpolysiloxane of the component (B) include 1,1,3,3-tetramethyldisiloxane, 1,3,5,7-tetramethylcyclotetrasiloxane, tris(hydrogen dimethylsiloxy)methylsilane, tris(hydrogendimethylsiloxy)phenylsilane, methylhydrogencyclopolysiloxane, methylhydrogenpolysiloxane which is terminated at both ends with trimethylsiloxy group, dimethylsiloxane-methylhydrogensiloxane copolymer which is terminated at both ends with trimethylsiloxy group, dimethylpolysiloxane which is terminated at both ends with dimethylhydrogen siloxy group, dimethylsiloxane-methylhydrogensiloxane copolymer which is terminated at both ends with dimethylhydrogensiloxy group, methylhydrogensiloxane-diphenylsiloxane copolymer which is terminated at both ends with trimethylsiloxy group, methylhydrogensiloxane-diphenylsiloxane-dimethylsiloxane copolymer which is terminated at both ends with trimethylsiloxy group, methylhydrogensiloxane-methylphenylsiloxane-dimethylsiloxane copolymer which is terminated at both ends with trimethylsiloxy group, methylhydrogensiloxane-dimethyl siloxane-diphenylsiloxane copolymer which is terminated at both ends with dimethylhydrogensiloxy group, methylhydrogen siloxane-dimethylsiloxane-methylphenylsiloxane copolymer which is terminated at both ends with dimethylhydrogensiloxy group, a copolymer comprising $(CH_3)_2HSiO_{1/2}$ unit and $(CH_3)_3SiO_{1/2}$ unit and $SiO_{4/2}$ unit, a copolymer comprising $(CH_3)_2HSiO_{1/2}$ unit and $SiO_{4/2}$ unit, a copolymer comprising $(CH_3)_2HSiO_{1/2}$ unit and $SO_{4/2}$ unit and $(C_6H_5)_3SiO_{1/2}$ unit, and any of those compounds wherein the methyl group is partly or entirely substituted, for example, with an alkyl group such as ethyl group or propyl group or phenyl group.

The organohydrogenpolysiloxane of the component (B) is typically incorporated at an amount of 0.3 to 20 parts by weight, preferably 0.5 to 15 parts by weight, and more preferably 0.8 to 10 parts by weight in relation to 100 parts by weight of the component (A). When component (B) is incorporated at an excessive low amount, the crosslinking point will be reduced (namely, the crosslinking density will be reduced), and this may result in the failure of obtaining a rubbery elastomer (cured rubber), whereas an excessively high content of the component (B) also results in the insufficient rubber property due to dispersion of the crosslinking point.

Furthermore, ratio of the hydrogen atom which is bonded to the silicon atom in the polyorganosiloxane in the component (B) (SiH functional group) to the total amount of the alkenyl group bonded to the silicon atom in the component (A) (SiH functional group/alkenyl group) is preferably 0.6 to 3.0, and more preferably 0.8 to 2.5. When this ratio is less than 0.6, the resulting rubber may not be sufficiently crosslinked, whereas the ratio in excess of 3.0 may result in the large amount of the unreacted low-molecular weight siloxane having the SiH functional group remaining in the resulting product.

The catalyst used for the addition reaction of the component (C) may be a metal catalyst of platinum group known in the art, and exemplary such catalysts include platinum black, platinic chloride, chloroplatinic acid, reaction product of chloroplatinic acid and a monohydric alcohol, complex of chloroplatinic acid and an olefin, complex of chloroplatinic acid and vinyl siloxane, a platinum catalyst such as platinum bisacetoacetate, palladium catalyst, rhodium catalyst. The catalyst may be used at a catalytic amount for the addition reaction, and the amount is typically about 0.5 to 1,000 ppm, and in particular, about 1 to 500 ppm in terms of the platinum group element in relation to the total weight of the components (A) and (B).

In addition to the components as described above, the composition may optionally contain a filler such as fumed silica, precipitated silica, quartz powder, diatomaceous earth, or calcium carbonate; an electroconductive agent such as carbon black, electroconductive zinc oxide, or metal powder; a hydrosilylation inhibitor such as a nitrogen-containing compound or acetylene compound, phosphorus compound, nitryl compound, carboxylate, tin compound, mercury compound, or sulfur compound; a heat resistant agent such as iron oxide or cerium oxide; a internal mold release agent such as dimethyl silicone oil, tackifier, thixotropic agent at an amount that does not adversely affect the objects of the present invention.

The addition curing silicone rubber composition of the present invention may be prepared by homogeneously mixing the components as described above by using a blender or a mixer such as a kneader or a planetary mixer which is commonly used in the art.

In addition to the components (A) to (C) and other optionally added components, the addition curing silicone rubber composition of the present invention would contain components primarily derived from the organohydrogenpolysiloxane which is typically a polyorganosiloxane containing at least one hydrogen atom which is bonded to the silicon atom (SiH functional group) per molecule and having the degree of polymerization of up to 10; for example, a diorganosiloxane-organohydrogen siloxane cyclic copolymer having the degree of polymerization of up to 10; and in particular, the one represented by the following formula (5):

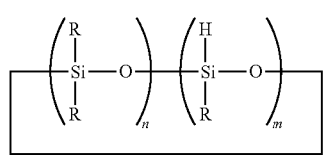

(5)

wherein m is an integer of 1 to 9 (and in particular, an integer of 1 to 3), n is an integer of 1 to 9, with the proviso that n+m is an integer of 3 to 10; R is independently an optionally substituted monovalent hydrocarbon group containing 1 to 10 carbon atoms); and more specifically, a low-molecular weight cyclic siloxane containing the SiH functional group at a low concentration as represented by the number of SiH functional groups (namely, the number "m" of the organohydrogensiloxane repeating units in the molecule) of as small as 1 to 3, and having the degree of polymerization (the number of silicon atoms) of up to 10. However, in the addition curing silicone rubber composition of the present invention, content of such components primarily derived from the organohydrogenpolysiloxane has been reduced to the level of up to 0.5% by weight (0 to 0.5% by weight), preferably up to 0.30% by weight (0 to 0.30% by weight), and more preferably up to 0.20% by weight (0 to 0.20% by weight) in relation to the total weight of the composition, and in particular, the total weight of the components (A), (B), and (C). The content of the low-molecular weight siloxane having the SiH functional group has been reduced because, if the low-molecular weight siloxane having the SiH functional group remains in the cured product like the conventional low-molecular weight siloxane having no functional group, it causes various problems by volatilizing from the cured product into the atmosphere and depositing on the surrounding surface, and in addition, since it has SiH functional group, the deposited low-molecular weight siloxane containing the SiH functional group is not readily removable by such means as wiping with a solvent.

Preferably, the organohydrogenpolysiloxane of the component (B) may contain the polyorganosiloxane containing at least one (and in particular, 1 to 3) hydrogen atoms which are bonded to the silicon atom (SiH functional groups) per molecule and having the degree of polymerization of up to 10, in particular, the cyclic low-molecular weight polyorganosiloxane, and more specifically, the organohydrogen siloxane-diorganosiloxane cyclic copolymer represented by the formula (5) at the lowest possible content. However, content of the low-molecular weight polyorganosiloxane in the component (B) is allowable as long as the content in relation to the total weight of the composition, and in particular, total weight of the components (A), (B), and (C) of up to 0.5% by weight is realized. However, the content of the SiH group-containing low-molecular weight polyorganosiloxane is typically up to 10.0% by weight (0 to 10.0% by weight), preferably up to 5.0% by weight (0 to 5.0% by weight), more preferably up to 3.0% by weight (0 to 3.0% by weight), and still more preferably up to 2.0% by weight (0 to 2.0% by weight) in the component (B).

Of the low-molecular weight cyclic siloxanes containing the SiH group, those crosslinking agents having a high addition reactivity will be at least partly incorporated in the matrix of the cured product by the crosslinking of the rubber. However, since the low-molecular weight cyclic siloxanes having a low SiH functional group concentration as represented by the number of the SiH functional group in the molecule (and in particular, the number of the SiH group having a relatively low addition reactivity which is located not at the terminal but in the molecular chain, for example, the SiH group in a bifunctional siloxane unit represented, for example, by $R^2HSiO_{2/2}$ unit) of as low as 1 to 3, and having at least one a diorganosiloxane unit such as $R^2_2SiO_{2/2}$ unit per molecule, and having the degree of polymerization (the number of silicon atoms in the molecule) of up to 10 have particularly low addition reactivity, they will remain in the cured product as the low-molecular weight siloxanes containing the unreacted SiH functional group in free form. When such low-molecular weight siloxanes volatilize into the atmosphere and deposit on the surrounding surfaces during the storage or use of the product, the deposited low-molecular weight cyclic siloxanes having the SiH group will cause a wide variety of problems such as contact fault, adhesion failure, hydrophobicization of the surface, and change in the outer appearance. In particular, when the low-molecular weight cyclic siloxanes containing the SiH group remain in the component (B) at an amount in excess of 10.0% by weight, a large proportion of such low-molecular weight cyclic siloxanes containing the SiH group is likely to remain in the cured product, and this may have a serious adverse effect on the product.

The removal of the low-molecular weight siloxane containing the SiH group may be accomplished by any method. However, the removal by distillation at a high temperature for long period as carried out in the conventional removal of the low-molecular weight siloxane having no functional group is not preferable in the case of the low-molecular weight siloxane having a highly reactive SiH functional group, and the removal of the low-molecular weight siloxane is preferably conducted at a temperature of up to 210° C., and more preferably up to 200° C., and when the removal is conducted at a temperature in excess of 210° C., use of a thin film evaporator will be required so that the oil will not be exposed to the high temperature for an unduly long time. When the removal is conducted at a temperature in excess of 210° C., it is also preferable that volatilization of the low-molecular weight siloxane is promoted, for example, by forced bubbling of an inert gas in addition to the thorough agitation of the content of the evaporator.

The volatilization of the low-molecular weight siloxane may be accomplished most typically by volatilization to the exterior of the system by agitating the mixture at a high temperature and at a reduced pressure, which is preferably conducted at a reduced pressure of 1,000 to 1 Pa and at a temperature of 150 to 210° C. for a period of 10 minutes to 10 hours.

The total content of the low-molecular weight siloxane having no functional group and the low-molecular weight siloxane having the SiH group in the entire silicone rubber composition is preferably up to 1% by weight (0 to 1% by weight), and in particular, up to 0.8% by weight (0 to 0.8% by weight).

In the present invention, content of such low-molecular weight siloxanes is measured by adding 10 cc of acetone to 1 g sample in a sample bottle, and allowing the sample to stand at room temperature (25° C.) for 24 hours. The low-molecular weight siloxane extracted in the acetone is then measured by gas chromatography (by using an FID detector). In this case, identification and differentiation of the low-molecular weight siloxane component containing no functional group and the low-molecular weight siloxane component containing the SiH may be accomplished by GC-MS and $Si^{29}$-NMR.

The conditions used for curing the addition curing silicone rubber composition of the present invention may be the same as those used for curing the known addition curing silicone rubber composition. Although the silicone rubber composition cures at room temperature to a sufficient level, it may be optionally heated to a temperature of 80 to 250° C., and in particular, at 120 to 220° C. for 3 seconds to 10 minutes, and in particular, for 5 seconds to 3 minutes to thereby cure the composition.

As in the case of the composition before the curing, the cured silicone rubber produced by curing the silicone rubber composition of the present invention also has the content of the low-molecular weight siloxane containing the SiH group of up to 0.5% by weight (0 to 0.5% by weight), preferably 0.2% by weight up to (0 to 0.2% by weight), and more preferably 0.1% by weight up to (0 to 0.1% by weight); and the total of the low-molecular weight siloxane having no functional group and the low-molecular weight siloxane containing the SiH group is 1% by weight up to (0 to 1% by weight), preferably up to 0.8% by weight (0 to 0.8% by weight), and more preferably 0.5% by weight up to (0 to 0.5% by weight).

The thus obtained cured product of the addition curing silicone rubber composition has the content of the low-molecular weight siloxane component, and in particular, the content of the low-molecular weight siloxane component having the reactive group which is below the predetermined level, and as a consequence, volatilization of the low-molecular weight siloxane rubber from the cured rubber has been reduced, and the problems such as clouding or haze, contact fault, adhesion failure, and hydrophobicization of the surface caused by the deposition of the volatilized low-molecular weight siloxane component on the surrounding surfaces have been thereby obviated.

EXAMPLES

Next, the present invention is described in further detail by referring to the Examples and the Comparative Examples, which by no means limit the scope of the present invention. In the following Examples, content of the low-molecular weight siloxane having no functional group in the alkenyl-containing polyorganosiloxane (the base polymer) and the content of the low-molecular weight siloxane having the SiH functional group in the crosslinking agent were identified and analyzed by GC-MS and $Si^{29}$-NMR; and content of the low-molecular weight siloxane having no functional group and the content of the low-molecular weight siloxane having the SiH functional group in the entire composition and the cured silicone rubber were measured by acetone extraction followed by GC-MS and $Si^{29}$-NMR according to the method for measuring the content of the low-molecular weight siloxane as described above.

Reference Example

The low-molecular weight siloxane in the vinyl group-containing polyorganosiloxane (component (A)) and the low-molecular weight siloxane in the organohydrogenpolysiloxane (component (B)) were reduced as described below.

The low-molecular weight siloxane (the low-molecular weight siloxane having no functional group) in the vinyl group-containing polyorganosiloxane (component (A)) was reduced by heating the compound at 200° C. for 6 hours at a reduced pressure of about 100 Pa with stirring to remove the low-molecular weight siloxane component; bubbling nitrogen gas through the compound for 4 hours for removing the low-molecular weight siloxane component; and finally, heating the compound at 250° C. for 2 hours at a reduced pressure of up to 50 Pa to thereby reduce the low-molecular weight siloxane component.

The low-molecular weight siloxane (mainly comprising the low-molecular weight siloxane containing the SiH group and the low-molecular weight siloxane containing no functional group) in the organohydrogenpolysiloxane (component (B)) was reduced by heating the compound at 180° C. for 6 hours at a reduced pressure of about 100 Pa with stirring to remove the low-molecular weight siloxane component; bubbling nitrogen gas through the compound for 4 hours to remove the low-molecular weight siloxane component; and finally, allowing the compound (oily organohydrogenpolysiloxane) to flow over a hot plate heated to a temperature of 200° C. at a reduced pressure of up to 20 Pa in the form of a thin film having at a thickness of up to 100 µm to thereby reduce the content of the low-molecular weight siloxane component.

Example 1

65 parts by weight of a dimethylpolysiloxane terminated at both ends with dimethylvinylsiloxy group having an average degree of polymerization of 500 [content of the low-molecular weight siloxane having a degree of polymerization of up to 10 and having no SiH functional group (hereinafter referred to as the low-molecular weight siloxane having no functional group): 0.08% by weight], 30 parts by weight of fumed silica having a specific surface area of 200 m²/g (Aerosil 200 manufactured by Nippon Aerosil Co., Ltd.), 5 parts by weight of hexamethyldisilazane, and 2.0 parts by weight of water were mixed at room temperature for 30 minutes, and the mixture was heated to 150° C. After stirring for 3 hours, the mixture was cooled to produce the silicone rubber base.

To 100 parts by weight of this silicone rubber base was added 40 parts by weight of dimethylpolysiloxane terminated at both ends with dimethylvinylsiloxy group having an average degree of polymerization of 250 [content of the low-molecular weight siloxane having a degree of polymerization of up to 10 and having no SiH functional group: 0.03% by weight], and the mixture was stirred for 30 minutes. Then, 1.5 parts by weight [Si—H/alkenyl group=1.5] of methylhydrogenpolysiloxane having the SiH functional group on both ends and on the side chain [content of the low-molecular weight cyclic siloxane having a degree of polymerization of up to 10 and having 1 to 3 SiH functional groups represented by the formula (5): 7.8% by weight] represented by the following formula:

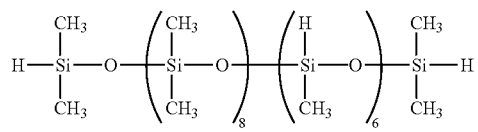

as the crosslinking agent, and 0.05 parts by weight of ethynylcyclohexanol as the reaction inhibitor were added, and the mixture was stirred for 15 minutes to produce the silicone rubber composition.

Content of the low-molecular weight siloxane having no functional group and the low-molecular weight siloxane both having the SiH functional group having the degree of polymerization of up to 10 in the entire silicone rubber composition was 0.14% by weight. Of such low-molecular weight siloxanes, content of the one having at least one SiH functional group was 0.09% by weight (with the content of the one having the cyclic structure represented by the formula (5) being 0.08% by weight, and the content of the one having a straight chain structure being 0.01% by weight), and content of the one having no functional group was 0.05% by weight.

This silicone rubber composition was mixed with 0.1 parts by weight of a platinum catalyst (Pt concentration, 1%), and the mixture was press cured at 120° C. for 10 minutes to produce a rubber sheet having a thickness of 2 mm. Content of the low-molecular weight siloxane having no functional group and the low-molecular weight siloxane having the SiH functional group having a degree of polymerization of up to 10 in this rubber sheet measured by extracting the sheet with acetone (by immersion at 25° C. for 24 hours) was 0.06% by weight. Of such low-molecular weight siloxanes, content of the one having at least one SiH functional group was 0.01% by weight (with the content of the one having the cyclic structure represented by the formula (5) being about 0.01% by weight, and the content of the one having a straight chain structure being less than 0.001% by weight), and content of the one having no functional group was less than 0.05% by weight.

This rubber sheet was evaluated for its hardness, tensile strength, and elongation at break by the procedure according to JIS-K6249. The results are shown in Table 1.

A test piece having a size of 50 mm×50 mm was cut out from this rubber sheet, and this test piece was placed in a 500 cc metal can together with an iron plate and an aluminum plate having a size of about 25 mm×50 mm. This metal can was placed in an oven at 200° C. for 2 hours. The iron plate and an aluminum plate recovered from the oven was measured for its contact angle with water. The contact angle with water was also measured after wiping the surface with hexane. The results are shown in Table 2 together with the contact angle before placing in the metal can.

Example 2

65 parts by weight of a dimethylpolysiloxane terminated at both ends with trimethylsiloxy group and having vinyl group on the side chain and having an average degree of polymerization of 420 (vinyl group content: 0.00022 mole/g) [content of the low-molecular weight siloxane having a degree of polymerization of up to 10 and having no SiH functional group: 0.20% by weight], 40 parts by weight of fumed silica having its surface hydrophobicized with dimethyldichlorosilane and having a specific surface area of 130 m²/g (Aerosil 200 manufactured by Nippon Aerosil Co., Ltd.), 5 parts by weight of hexamethyldisilazane, and 2.0 parts by weight of water were mixed at room temperature for 30 minutes, and the mixture was heated to 150° C. After stirring for 3 hours, the mixture was cooled to produce the silicone rubber base.

To 105 parts by weight of this silicone rubber base was added 30 parts by weight of dimethylpolysiloxane terminated at both ends with dimethylvinylsiloxy group having an average degree of polymerization of 180 [content of the low-molecular weight siloxane having a degree of polymerization of up to 10 and having no SiH functional group: 0.08% by weight], and the mixture was stirred for 30 minutes. Then, 4.0 parts by weight [Si—H/alkenyl group=2.0] of methylhydrogenpolysiloxane having the SiH functional group on the side chain [content of the low-molecular weight cyclic siloxane having a degree of polymerization of up to 10 and having 1 to 3 SiH functional groups represented by the formula (5): 2.1% by weight] represented by the following formula:

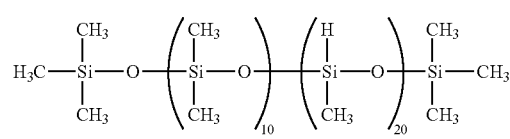

as the crosslinking agent, and 0.05 parts by weight of ethynylcyclohexanol as the reaction inhibitor were added, and the mixture was stirred for 15 minutes to produce the silicone rubber composition.

Content of the low-molecular weight siloxane having no functional group and the low-molecular weight siloxane both having the SiH functional group having the degree of polymerization of up to 10 in the entire silicone rubber composition was 0.24% by weight. Of such low-molecular weight siloxanes, content of the one having at least one SiH functional group was 0.06% by weight (with the content of the one having the cyclic structure represented by the formula (5) being 0.05% by weight, and the content of the one having a straight chain structure being 0.01% by weight), and content of the one having no functional group was 0.18% by weight.

This silicone rubber composition was mixed with 0.1 parts by weight of a platinum catalyst (Pt concentration, 1%), and the mixture was press cured at 120° C. for 10 minutes to produce a rubber sheet having a thickness of 2 mm. Content of the low-molecular weight siloxane having no functional group and the low-molecular weight siloxane having the SiH functional group having a degree of polymerization of up to 10 in this rubber sheet measured by extracting the sheet with acetone (by immersion at 25° C. for 16 hours) was 0.19% by weight. Of such low-molecular weight siloxanes, content of the one having at least one SiH functional group was 0.02% by weight (with the content of the one having the cyclic structure represented by the formula (5) being about 0.02% by weight, and the content of the one having a straight chain structure being less than 0.001% by weight), and content of the one having no functional group was less than 0.17% by weight.

This rubber sheet was evaluated for its hardness, tensile strength, and elongation at break by the procedure according to JIS-K6249. The results are shown in Table 1.

A test piece having a size of 50 mm×50 mm was cut out from this rubber sheet, and this test piece was placed in a 500 cc metal can together with an iron plate and an aluminum plate having a size of about 25 mm×50 mm. This metal can was placed in an oven at 200° C. for 2 hours. The iron plate and an aluminum plate recovered from the oven was measured for its contact angle with water. The contact angle with water was also measured after wiping the surface with hexane. The results are shown in Table 2 together with the contact angle before placing in the metal can.

Example 3

65 parts by weight of a raw rubber-like polyorganosiloxane comprising 99.30% by mole of dimethyl siloxane unit and 0.70% by mole of methylvinylsiloxane unit and having both ends terminated with trimethylsiloxy group having an average degree of polymerization of about 8000 [content of the low-molecular weight siloxane having a degree of polymerization of up to 10 and having no SiH functional group: 0.49% by weight], 5 parts by weight of silanol terminated dimethylpolysiloxane (average degree of polymerization: 10) as a dispersant, and 30 parts by weight of fumed silica having a specific surface area of 200 m²/g (Aerosil 200 manufactured by Nippon Aerosil Co., Ltd.) were mixed in a pressurized kneader to prepare a rubber compound.

To 100 parts by weight of this rubber compound were added 20 parts by weight of a raw rubber-like organopolysiloxane comprising 98.80% by mole of dimethyl siloxane unit and 1.20% by mole of methylvinylsiloxane unit and having both ends terminated with trimethylsiloxy group and having an average degree of polymerization of about 8000 [content of the low-molecular weight siloxane having a degree of polymerization of up to 10 and having no SiH functional group: 0.41% by weight], 8.0 parts by weight [Si—H/alkenyl group=2.5] of methylhydrogenpolysiloxane having the SiH functional group on the side chain [content of the low-molecular weight cyclic siloxane having a degree of polymerization of up to 10 and having 1 to 3 SiH functional groups represented by the formula (5): 1.8% by weight] represented by the following formula:

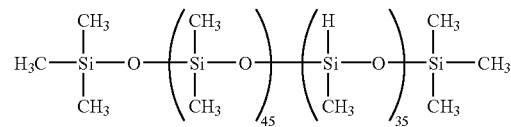

as the crosslinking agent, and 0.05 parts by weight of ethynylcyclohexanol as the reaction inhibitor were added. The mixture was kneaded with two rolls for 15 minutes to produce the silicone rubber composition.

Content of the low-molecular weight siloxane having no functional group and the low-molecular weight siloxane both having the SiH functional group having the degree of polymerization of up to 10 in the entire silicone rubber composition was 0.56% by weight. Of such low-molecular weight siloxanes, content of the one having at least one SiH functional group was 0.12% by weight (with the content of the one having the cyclic structure represented by the formula (5) being 0.11% by weight, and the content of the one having a straight chain structure being 0.01% by weight), and content of the one having no functional group was 0.44% by weight.

This silicone rubber composition was mixed with 0.1 parts by weight of a platinum catalyst (Pt concentration, 1%), and the mixture was press cured at 120° C. for 10 minutes to produce a rubber sheet having a thickness of 2 mm. Content of the low-molecular weight siloxane having no functional group and the low-molecular weight siloxane having the SiH functional group having a degree of polymerization of up to 10 in this rubber sheet measured by extracting the sheet with acetone (by immersion at 25° C. for 24 hours) was 0.46% by weight. Of such low-molecular weight siloxanes, content of the one having at least one SiH functional group was 0.04% by weight (with the content of the one having the cyclic structure represented by the formula (5) being about 0.04% by weight, and the content of the one having a straight chain structure being less than 0.001% by weight), and content of the one having no functional group was less than 0.42% by weight.

This rubber sheet was evaluated for its hardness, tensile strength, and elongation at break by the procedure according to JIS-K6249. The results are shown in Table 1.

A test piece having a size of 50 mm×50 mm was cut out from this rubber sheet, and this test piece was placed in a 500 cc metal can together with an iron plate and an aluminum plate having a size of about 25 mm×50 mm. This metal can was placed in an oven at 200° C. for 2 hours. The iron plate and an aluminum plate recovered from the oven was measured for its contact angle with water. The contact angle with water was also measured after wiping the surface with hexane. The results are shown in Table 2 together with the contact angle before placing in the metal can.

Comparative Example 1

65 parts by weight of a dimethylpolysiloxane terminated at both ends with dimethylvinylsiloxy group having an average degree of polymerization of 500 [content of the low-molecular weight siloxane having a degree of polymerization of up to 10 and having no SiH functional group: 0.50% by weight], 30 parts by weight of fumed silica having a specific surface area of 200 m²/g (Aerosil 200 manufactured by Nippon Aerosil Co., Ltd.), 5 parts by weight of hexamethyldisilazane, and 2.0 parts by weight of water were mixed at room temperature for 30 minutes, and the mixture was heated to 150° C. After stirring for 3 hours, the mixture was cooled to produce the silicone rubber base.

To 100 parts by weight of this silicone rubber base was added 40 parts by weight of dimethylpolysiloxane terminated at both ends with dimethylvinylsiloxy group having an average degree of polymerization of 250 [content of the low-molecular weight siloxane having a degree of polymerization of up to 10 and having no SiH functional group: 0.33% by weight], and the mixture was stirred for 30 minutes. Then, 1.5 parts by weight [Si—H/alkenyl group=1.5] of a mixture of methylhydrogenpolysiloxane having the SiH functional group on both ends and on the side chain represented by the following formula:

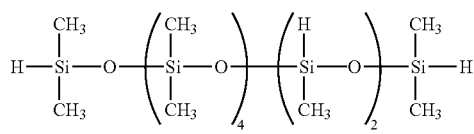

and a dimethylsiloxane-methylhydrogenpolysiloxane cyclic copolymer represented by the following formula:

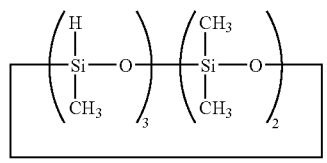

[content of the low-molecular weight cyclic siloxane having a degree of polymerization of up to 10 and having 1 to 3 SiH functional groups represented by the formula (5): 60.0% by weight] as the crosslinking agent, and 0.05 parts by weight of ethynylcyclohexanol as the reaction inhibitor were added, and the mixture was stirred for 15 minutes to produce the silicone rubber composition.

Content of the low-molecular weight siloxane having no functional group and the low-molecular weight siloxane both having the SiH functional group having the degree of polymerization of up to 10 in the entire silicone rubber composition was 1.05% by weight. Of such low-molecular weight siloxanes, content of the one having at least one SiH functional group was 0.64% by weight (with the content of the one having the cyclic structure represented by the formula (5) being 0.52% by weight, and the content of the one having a straight chain structure being 0.12% by weight), and content of the one having no functional group was 0.41% by weight.

This silicone rubber composition was mixed with 0.1 parts by weight of a platinum catalyst (Pt concentration, 1%), and the mixture was press cured at 120° C. for 10 minutes to produce a rubber sheet having a thickness of 2 mm. Content of the low-molecular weight siloxane having no functional group and the low-molecular weight siloxane having the SiH functional group having a degree of polymerization of up to 10 in this rubber sheet measured by extracting the sheet with acetone (by immersion at 25° C. for 24 hours) was 0.56% by weight. Of such low-molecular weight siloxanes, content of the one having at least one SiH functional group was 0.12% by weight (with the content of the one having the cyclic structure represented by the formula (5) being about 0.11% by weight, and the content of the one having a straight chain structure being less than 0.01% by weight), and content of the one having no functional group was less than 0.44% by weight.

This rubber sheet was evaluated for its hardness, tensile strength, and elongation at break by the procedure according to JIS-K6249. The results are shown in Table 1.

A test piece having a size of 50 mm×50 mm was cut out from this rubber sheet, and this test piece was placed in a 500 cc metal can together with an iron plate and an aluminum plate having a size of about 25 mm×50 mm. This metal can was placed in an oven at 200° C. for 2 hours. The iron plate and an aluminum plate recovered from the oven was measured for its contact angle with water. The contact angle with water was also measured after wiping the surface with hexane. The results are shown in Table 2 together with the contact angle before placing in the metal can.

Comparative Example 2

65 parts by weight of a dimethylpolysiloxane terminated at both ends with trimethylsiloxy group and having vinyl group on the side chain and having an average degree of polymerization of 420 (vinyl group content: 0.00022 mole/g) [content of the low-molecular weight siloxane having a degree of polymerization of up to 10 and having no SiH functional group: 1.05% by weight], 40 parts by weight of fumed silica having its surface hydrophobicized with dimethyldichlorosilane and having a specific surface area of 130 m$^2$/g (Aerosil 200 manufactured by Nippon Aerosil Co., Ltd.), 5 parts by weight of hexamethyldisilazane, and 2.0 parts by weight of water were mixed at room temperature for 30 minutes, and the mixture was heated to 150° C. After stirring for 3 hours, the mixture was cooled to produce the silicone rubber base.

To 105 parts by weight of this silicone rubber base was added 30 parts by weight of dimethylpolysiloxane terminated at both ends with dimethylvinylsiloxy group having an average degree of polymerization of 180 [content of the low-molecular weight siloxane having a degree of polymerization of up to 10 and having no SiH functional group: 0.91% by weight], and the mixture was stirred for 30 minutes. Then, 9.6 parts by weight [Si—H/alkenyl group=2.5] of methylhydrogenpolysiloxane having the SiH functional group on the side chain [content of the low-molecular weight cyclic siloxane having a degree of polymerization of up to 10 and having 1 to 3 SiH functional groups represented by the formula (5): 8.8% by weight] represented by the following formula:

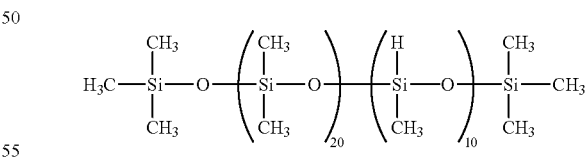

as the crosslinking agent, and 0.05 parts by weight of ethynylcyclohexanol as the reaction inhibitor were added, and the mixture was stirred for 15 minutes to produce the silicone rubber composition.

Content of the low-molecular weight siloxane having no functional group and the low-molecular weight siloxane both having the SiH functional group having the degree of polymerization of up to 10 in the entire silicone rubber composition was 1.56% by weight. Of such low-molecular weight siloxanes, content of the one having at least one SiH functional group was 0.63% by weight (with the content of the one having the cyclic structure represented by the formula (5) being 0.51% by weight, and the content of the one having a straight chain structure being 0.12% by weight), and content of the one having no functional group was 0.93% by weight.

This silicone rubber composition was mixed with 0.1 parts by weight of a platinum catalyst (Pt concentration, 1%), and the mixture was press cured at 120° C. for 10 minutes to produce a rubber sheet having a thickness of 2 mm. Content of the low-molecular weight siloxane having no functional group and the low-molecular weight siloxane having the SiH functional group having a degree of polymerization of up to 10 in this rubber sheet measured by extracting the sheet with acetone (by immersion at 25° C. for 24 hours) was 1.05% by weight. Of such low-molecular weight siloxanes, content of the one having at least one SiH functional group was 0.18% by weight (with the content of the one having the cyclic structure represented by the formula (5) being about 0.12% by weight, and the content of the one having a straight chain structure being less than 0.06% by weight), and content of the one having no functional group was less than 0.87% by weight.

This rubber sheet was evaluated for its hardness, tensile strength, and elongation at break by the procedure according to JIS-K6249. The results are shown in Table 1.

A test piece having a size of 50 mm×50 mm was cut out from this rubber sheet, and this test piece was placed in a 500 cc metal can together with an iron plate and an aluminum plate having a size of about 25 mm×50 mm. This metal can was placed in an oven at 200° C. for 2 hours. The iron plate and an aluminum plate recovered from the oven was measured for its contact angle with water. The contact angle with water was also measured after wiping the surface with hexane. The results are shown in Table 2 together with the contact angle before placing in the metal can.

Comparative Example 3

65 parts by weight of a raw rubber-like polyorganosiloxane comprising 99.30% by mole of dimethyl siloxane unit and 0.70% by mole of methylvinylsiloxane unit and having both ends terminated with trimethylsiloxy group having an average degree of polymerization of about 8000 [content of the low-molecular weight siloxane having a degree of polymerization of up to 10 and having no SiH functional group: 1.44% by weight], 5 parts by weight of silanol terminated dimethylpolysiloxane (average degree of polymerization: 10) as a dispersant, and 30 parts by weight of fumed silica having a specific surface area of 200 m$^2$/g (Aerosil 200 manufactured by Nippon Aerosil Co., Ltd.) were mixed in a pressurized kneader to prepare a rubber compound.

To 100 parts by weight of this rubber compound were added 20 parts by weight of a raw rubber-like organopolysiloxane comprising 98.80% by mole of dimethyl siloxane unit and 1.20% by mole of methylvinylsiloxane unit and having both ends terminated with trimethylsiloxy group and having an average degree of polymerization of about 8000 [content of the low-molecular weight siloxane having a degree of polymerization of up to 10 and having no SiH functional group: 1.20% by weight], 15.1 parts by weight [Si—H/alkenyl group=3.5] of methylhydrogenpolysiloxane having the SiH functional group on the side chain [content of the low-molecular weight cyclic siloxane having a degree of polymerization of up to 10 and having 1 to 3 SiH functional groups represented by the formula (5): 4.9% by weight] represented by the following formula:

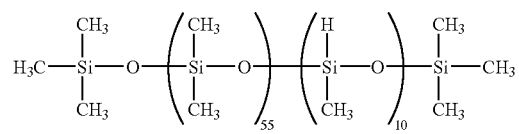

as the crosslinking agent, and 0.05 parts by weight of ethynylcyclohexanol as the reaction inhibitor were added. The mixture was kneaded with two rolls for 15 minutes to produce the silicone rubber composition.

Content of the low-molecular weight siloxane having no functional group and the low-molecular weight siloxane both having the SiH functional group having the degree of polymerization of up to 10 in the entire silicone rubber composition was 1.85% by weight. Of such low-molecular weight siloxanes, content of the one having at least one SiH functional group was 0.54% by weight (with the content of the one having the cyclic structure represented by the formula (5) being 0.50% by weight, and the content of the one having a straight chain structure being 0.04% by weight), and content of the one having no functional group was 1.31% by weight.

This silicone rubber composition was mixed with 0.1 parts by weight of a platinum catalyst (Pt concentration, 1%), and the mixture was press cured at 120° C. for 10 minutes to produce a rubber sheet having a thickness of 2 mm. Content of the low-molecular weight siloxane having no functional group and the low-molecular weight siloxane having the SiH functional group having a degree of polymerization of up to 10 in this rubber sheet measured by extracting the sheet with acetone (by immersion at 25° C. for 24 hours) was 1.49% by weight. Of such low-molecular weight siloxanes, content of the one having at least one SiH functional group was 0.21% by weight (with the content of the one having the cyclic structure represented by the formula (5) being about 0.19% by weight, and the content of the one having a straight chain structure being less than 0.02% by weight), and content of the one having no functional group was less than 1.28% by weight.

This rubber sheet was evaluated for its hardness, tensile strength, and elongation at break by the procedure according to JIS-K6249. The results are shown in Table 1.

A test piece having a size of 50 mm×50 mm was cut out from this rubber sheet, and this test piece was placed in a 500 cc metal can together with an iron plate and an aluminum plate having a size of about 25 mm×50 mm. This metal can was placed in an oven at 200° C. for 2 hours. The iron plate and an aluminum plate recovered from the oven was measured for its contact angle with water. The contact angle with water was also measured after wiping the surface with hexane. The results are shown in Table 2 together with the contact angle before placing in the metal can.

TABLE 1

|  | Example | | | Comparative Example | | |
|---|---|---|---|---|---|---|
|  | 1 | 2 | 3 | 1 | 2 | 3 |
| Hardness (Durometer A) | 32 | 52 | 66 | 27 | 49 | 62 |
| Tensile strength (MPa) | 6.4 | 4.9 | 5.9 | 5.5 | 4.8 | 5.5 |
| Elongation at break (%) | 480 | 360 | 290 | 550 | 380 | 300 |

TABLE 2

| Contact angle (Degree) | | Example | | | Comparative Example | | |
|---|---|---|---|---|---|---|---|
| | | 1 | 2 | 3 | 1 | 2 | 3 |
| Before the experiment | Fe | 55 | 55 | 55 | 55 | 55 | 55 |
| | Al | 44 | 44 | 44 | 44 | 44 | 44 |
| After leaving in the metal can | Fe | 105 | 103 | 108 | 107 | 108 | 111 |
| | Al | 109 | 110 | 110 | 110 | 113 | 115 |
| After wiping with hexane | Fe | 58 | 55 | 56 | 105 | 101 | 98 |
| | Al | 42 | 48 | 44 | 101 | 95 | 110 |

As demonstrated by the results shown in Table 2, when the silicone rubber sheet prepared by curing the silicone rubber composition was stored together with the iron sheet and the aluminum sheet in a sealed container, the composition of the Examples containing the low-molecular weight siloxane component having a degree of polymerization of up to 10 and at least one (and in particular, 1 to 3) SiH functional groups per molecule at a content lower than the predetermined content that had deposited on the surrounding metal member (iron and aluminum) could be easily wiped off the surface by using a solvent. In contrast, removal of the compositions of the Comparative Examples containing the low-molecular weight siloxane component having a degree of polymerization of up to 10 and at least one SiH functional group per molecule at an content higher than the predetermined content that had deposited on the surrounding member (iron and aluminum) was difficult even by wiping with a solvent.

Japanese Patent Application No. 2007-099068 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. An addition curing silicone rubber composition comprising:
   (A) 100 parts by weight of a polyorganosiloxane containing, on average, at least two alkenyl groups which are bonded to silicon atom, which is represented by the following average compositional formula (1):

$$R^1_a SiO_{(4-a)/2} \qquad (1)$$

wherein $R^1$ is independently a monovalent moiety selected from the group consisting of alkyl, aryl, aralkyl, alkenyl and trifluoropropyl, and a is a positive number of 1.5 to 2.8;
   (B) 0.3 to 20 parts by weight of an organohydrogenpolysiloxane having 11 to 300 silicon atoms per molecule and containing at least two hydrogen atoms which are bonded to silicon atom (SiH functional groups) per molecule, which is represented by the following average compositional formula (3):

$$R^2_b H_c SiO_{(4-b-c)/2} \qquad (3)$$

wherein $R^2$ is a monovalent moiety selected from the group consisting of alkyl, aryl, aralkyl and trifluoropropyl, b is a positive number of 0.7 to 2.1, and c is a positive number of 0.001 to 1.0, with the proviso that b+c is 0.8 to 3.0; and
   (C) a catalytic amount of an addition reaction catalyst;
   wherein ratio of the SiH functional group in the component (B) to the alkenyl group bonded to the silicon atom in the component (A) (SiH/Alkenyl group) is in the range of 0.6 to 3.0 and
   ratio of the total number of hydrogen atoms which are bonded to the silicon atom to the total number of carbon atoms in the component (B) ([hydrogen atom]/[carbon atom]) is less than 0.6, and content of the polyorganosiloxane having a degree of polymerization of up to 10 and containing at least one SiH functional group per molecule is up to 0.11% by weight in relation to the entire composition,
   wherein the polyorganosiloxane having a degree of polymerization of up to 10 and containing at least one SiH functional group is a cyclic polyorganosiloxane derived from the organohydrogenpolysiloxane (B).

2. The addition curing silicone rubber composition according to claim 1 wherein the polyorganosiloxane having a degree of polymerization of up to 10 and containing at least one SiH functional group per molecule is an organohydrogensiloxane-diorganosiloxane cyclic copolymer.

3. The addition curing silicone rubber composition according to claim 2 wherein the polyorganosiloxane having a degree of polymerization of up to 10 and containing at least one SiH functional group per molecule is a cyclic organohydrogenpolysiloxane represented by the following formula (5):

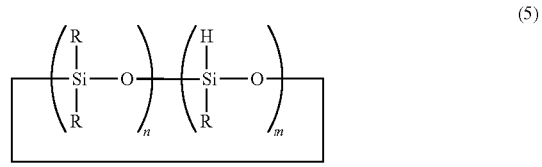

$$\left( \begin{matrix} R \\ | \\ Si-O \\ | \\ R \end{matrix} \right)_n \left( \begin{matrix} H \\ | \\ Si-O \\ | \\ R \end{matrix} \right)_m \qquad (5)$$

wherein m is an integer of 1 to 9 and n is an integer of 1 to 9 with the proviso that n+m is an integer of 3 to 10; R is independently an optionally substituted monovalent hydrocarbon group containing 1 to 10 carbon atoms.

4. The addition curing silicone rubber composition according to claim 3 wherein, in the formula (5), m is an integer of 1 to 3 and n is an integer of 1 to 9 with the proviso that n+m is an integer of 3 to 10.

5. The addition curing silicone rubber composition according to claim 1 wherein component (A) comprises up to 0.5% by weight of a polyorganosiloxane having a degree of polymerization of up to 10 and containing no SiH functional group.

6. The addition curing silicone rubber composition according to claim 5 wherein the polyorganosiloxane having a degree of polymerization of up to 10 and containing no SiH functional group is a cyclic polyorganosiloxane represented by the following formula (2):

$$\left( \begin{matrix} R \\ | \\ Si-O \\ | \\ R \end{matrix} \right)_x \qquad (2)$$

wherein x is an integer of 3 to 10, and R is independently an optionally substituted monovalent hydrocarbon group containing 1 to 10 carbon atoms.

7. The addition curing silicone rubber composition according to claim 1 wherein the component (B) is an organohydrogenpolysiloxane having a straight chain, cyclic, branched, or three dimensional network structure with a degree of polymerization of at least 11.

8. The addition curing silicone rubber composition according to claim 7 wherein the component (B) is an organohydrogenpolysiloxane represented by the following formula (4):

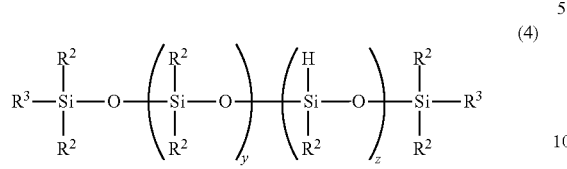

wherein y is an integer of 1 to 98 and z is an integer of 2 to 50 with the proviso y+z is 9 to 100, $R^2$ is independently an optionally substituted monovalent hydrocarbon group containing 1 to 10 carbon atoms, and $R^3$ is $R^2$ or hydrogen atom.

9. The addition curing silicone rubber composition according to claim 1 wherein component (B) comprises up to 10.0% by weight of the polyorganosiloxane having a degree of polymerization of up to 10 and containing at least one SiH functional group per molecule.

10. A cured silicone rubber produced by a method comprising curing an addition curing silicone rubber composition comprising:
(A) 100 parts by weight of a polyorganosiloxane containing, on average, at least two alkenyl groups which are bonded to silicon atom, which is represented by the following average compositional formula (1):

wherein $R^1$ is independently a monovalent moiety selected from the group consisting of alkyl, aryl, aralkyl, alkenyl and trifluoropropyl, and a is a positive number of 1.5 to 2.8;
(B) 0.3 to 20 parts by weight of an organohydrogenpolysiloxane having 11 to 300 silicon atoms per molecule and containing at least two hydrogen atoms which are bonded to silicon atom (SiH functional groups) per molecule, which is represented by the following average compositional formula (3):

wherein $R^2$ is a monovalent moiety selected from the group consisting of alkyl, aryl, aralkyl and trifluoropropyl, b is a positive number of 0.7 to 2.1, and c is a positive number of 0.001 to 1.0, with the proviso that b+c is 0.8 to 3.0; and
(C) a catalytic amount of an addition reaction catalyst;
wherein ratio of the SiH functional group in the component (B) to the alkenyl group bonded to the silicon atom in the component (A) (SiH/Alkenyl group) is in the range of 0.6 to 3.0 and
ratio of the total number of hydrogen atoms which are bonded to the silicon atom to the total number of carbon atoms in the component (B) ([hydrogen atom]/[carbon atom]) is less than 0.6, and content of the polyorganosiloxane having a degree of polymerization of up to 10 and containing at least one SiH functional group per molecule is up to 0.11% by weight in relation to the entire composition,
wherein the polyorganosiloxane having a degree of polymerization of up to 10 and containing at least one SiH functional group is a cyclic polyorganosiloxane derived from the organohydrogenpolysiloxane (B).

11. The cured silicone rubber according to claim 10, wherein the component (B) comprises up to 10.0% by weight of the polyorganosiloxane having a degree of polymerization of up to 10 and containing at least one SiH functional group per molecule.

12. The cured silicone rubber according to claim 10, wherein the method includes, prior to the curing, the steps of reducing a low-molecular weight siloxane of the component (B).

13. The cured silicone rubber according to claim 12, wherein the steps of reducing the low molecular weight siloxane of the component (B) includes:
heating the component (B) at 180° C. for 6 hours at a reduced pressure of about 100 Pa with stirring to remove the low-molecular weight siloxane component;
bubbling nitrogen gas through the component (B) for 4 hours to remove the low-molecular weight siloxane component; and
allowing the component (B) to flow over a hot plate heated to a temperature of 200° C. at a reduced pressure of up to 20 Pa in the form of a thin film having at a thickness of up to 100 μm.

\* \* \* \* \*